United States Patent
Hennessy et al.

(10) Patent No.: US 7,521,685 B2
(45) Date of Patent: Apr. 21, 2009

(54) STRUCTURED SCINTILLATOR AND SYSTEMS EMPLOYING STRUCTURED SCINTILLATORS

(75) Inventors: William Hennessy, Rexford, NY (US); Jeffrey Shaw, Ballston Lake, NY (US); Ching-Yeu Wei, Niskayuna, NY (US); Yun Li, Niskayuna, NY (US)

(73) Assignee: General Electric Company, Nishayuna, NY (US)

( * ) Notice: Subject to any disclaimer, the term of this patent is extended or adjusted under 35 U.S.C. 154(b) by 101 days.

(21) Appl. No.: 11/334,718

(22) Filed: Jan. 18, 2006

(65) Prior Publication Data

US 2007/0164223 A1    Jul. 19, 2007

(51) Int. Cl.
  G01T 1/20   (2006.01)
  H01L 27/148 (2006.01)

(52) U.S. Cl. .............................. 250/370.11; 250/361 R; 250/367; 250/370.09

(58) Field of Classification Search ............. 250/361 R, 250/362, 367
See application file for complete search history.

(56) References Cited

U.S. PATENT DOCUMENTS

| | | | | |
|---|---|---|---|---|
| 5,171,996 A | * | 12/1992 | Perez-Mendez | 250/361 R |
| 5,187,369 A | * | 2/1993 | Kingsley et al. | 250/370.11 |
| 5,241,180 A | * | 8/1993 | Ishaque et al. | 250/361 R |
| 5,368,882 A | | 11/1994 | Tran et al. | 427/65 |
| 5,418,377 A | | 5/1995 | Tran et al. | 250/483.1 |
| 5,460,980 A | | 10/1995 | Tran et al. | 437/2 |
| 5,506,409 A | * | 4/1996 | Yoshida et al. | 250/368 |
| 5,892,230 A | * | 4/1999 | Goodberlet et al. | 250/361 R |
| 6,414,315 B1 | | 7/2002 | Wei et al. | 250/370.11 |
| 6,768,326 B2 | | 7/2004 | Brown et al. | 324/752 |
| 6,934,354 B2 | | 8/2005 | Hoffman | 378/19 |
| 6,979,826 B2 | * | 12/2005 | Ikhlef | 250/367 |
| 2002/0067796 A1 | * | 6/2002 | Hoffman | 378/19 |
| 2003/0031296 A1 | * | 2/2003 | Hoheisel | 378/98.8 |

OTHER PUBLICATIONS

Berengard, Dr. Yury. "Cone", All Elementary Mathematics, Jan. 23, 2008: www.bymath.com/studyguide/geo/sec/geo17.htm.*

* cited by examiner

*Primary Examiner*—David P Porta
*Assistant Examiner*—Casey Bryant
(74) *Attorney, Agent, or Firm*—Joseph J. Christian

(57) ABSTRACT

A structured scintillator and a detection system employing structured scintillators. More specifically, a structured scintillator comprising a scintillator material having a plurality of isolated structures is disclosed. The structures may be conical in shape. The structures may be formed on a substantially transparent material layer which has been patterned to form a plurality of isolated regions. The structures may be formed on top of the isolated regions to provide isolated scintillator structures having space therebetween. The isolated regions and scintillator structures may be aligned with underlying detection devices.

25 Claims, 3 Drawing Sheets

Replaced Reference Number "36" with "40"

STRUCTURED SCINTILLATOR AND SYSTEMS EMPLOYING STRUCTURED SCINTILLATORS

BACKGROUND

The invention relates generally to radiation detection systems. More specifically, it relates to a structured scintillator which may be employed in an x-ray detection system.

Many digital photo detection systems employ scintillators to convert incident radiation into light for detection at a light detection device, such as a photodiode. A scintillator is a device or substance that absorbs high energy (ionizing) electromagnetic or charged particle radiation then, in response, fluoresces photons at a characteristic Stokes-shifted (longer) wavelength, releasing the previously absorbed energy. Scintillators are defined by their short fluorescence decay times and optical transparency at wavelengths of their own specific emission energy, characteristics which set them apart from phosphors.

As will be appreciated, scintillator crystals are widely used in detectors for x-rays, gamma rays, cosmic rays, and particles characterized by an energy level of greater than about 1 keV. From such crystals, it is possible to manufacture detection systems, in which the crystal is coupled with a light-detection device, such as a photodetector. When ionizing radiation impacts the crystal, the crystal emits light. The photodetector produces an electrical signal proportional to the number of light pulses received, and proportional to the intensity of the light pulses. Photodetectors are commonly used for many applications, such as medical imaging equipment, e.g., positron emission tomography (PET) devices, well logging for the oil and gas industry, and various digital imaging applications. However, there are numerous problems associated with the use of conventional detection systems in typical applications, as described further below.

In flat panel detection systems, light is generated and detected isotropically. In order to achieve good image quality, the position of incoming light should be accurately recorded. Accordingly, it is desirable to minimize the lateral spreading of photons generated in the scintillator. In certain applications, it may be advantageous to employ x-ray detection arrays, which allow bending such that the detector can be conformed to various non-planar shapes. In such applications, the scintillator may also be flexed. Because of the typical construction of scintillators, the bending of the scintillator may damage the scintillator of conventional devices.

Therefore there is a need for improved scintillators that may be employed in x-ray detection systems.

BRIEF DESCRIPTION

In accordance with an exemplary embodiment of the present invention, there is provided a structured scintillator comprising a flexible substrate. The structured scintillator further comprises a substantially transparent material layer disposed on the flexible substrate and patterned to provide a plurality of isolated regions. The structured scintillator further comprises a scintillator material disposed on the substantially transparent material layer and comprising a plurality of isolated structures.

In accordance with an exemplary embodiment of the present invention, there is provided a structured scintillator comprising a substrate. The structured scintillator further comprises a substantially transparent material layer disposed on the substrate and patterned to provide a plurality of isolated regions. The structured scintillator further comprises a scintillator material disposed on the substantially transparent material layer and comprising a plurality of conical structures.

In accordance with another exemplary embodiment of the present invention, there is provided a scintillator comprising a material structured to form a plurality of conical structures configured to guide photons, wherein each of the plurality of conical structures comprises a top portion configured to receive incident radiation and a bottom portion configured to emit photons, wherein the bottom portion is narrower than the top portion.

In accordance with yet another exemplary embodiment of the present invention, there is provided a detection system comprising a photo detection array and a scintillator. The photo detection array comprises a plurality of detectors configured to detect light emissions. The scintillator is configured to receive incident radiation and emit photons toward the photo detection array and comprises a plurality of isolated structures.

In accordance with still another exemplary embodiment of the present invention, there is provided method of fabricating a scintillator. The method comprises patterning a substantially transparent material onto a substrate to provide a plurality of isolated regions of the material on the substrate. The method further comprises forming a conical scintillator structure on each of the plurality of isolated regions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
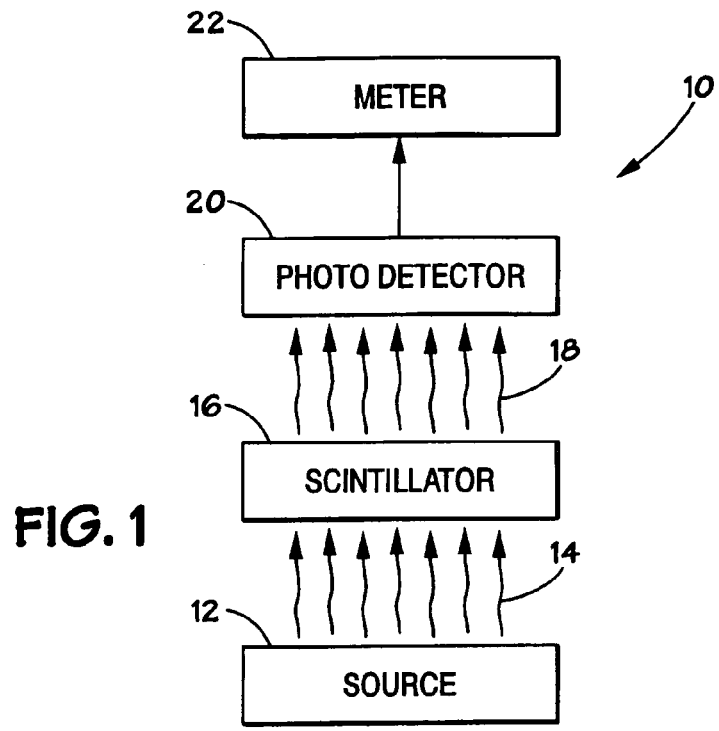
FIG. 1 is a block diagram of an exemplary embodiment of a radiation detection system employing a structured scintillator, in accordance with aspects of the present invention.

FIG. 1 is a block diagram of a detection system 10 in accordance with one embodiment of the present invention. In the present exemplary embodiment, the system 10 is a radiation detection system. The system 10 includes a radiation source 12 which produces high-energy radiation 14, such as X-rays or gamma rays. The system 10 also includes a scintillator 16 for converting incident radiation into photons 18. In accordance with embodiments of the present invention, the scintillator 16 is a structured scintillator having conical structures. As will be described further below with respect to FIGS. 3-6, the conical structures are configured to gather and direct the photons 18 to respective pixels of a photodetector. As used herein, "adapted to," "configured to," and the like refer to elements that are sized, arranged or manufactured to form a specified structure or to achieve a specified result. The scintillator 16 receives the radiation 14 from the source 12 and converts the radiation into the photons 18. The number of photons 18 produced by the scintillator 16 is proportional to the amount of radiation received from the source 12. The photons 18 are then directed through a photodetector 20 producing an electric current that is measured by a meter 22.

The photodetector 20 is generally a semiconductor device which may include silicon carbide (SiC), gallium nitride (GaN) or aluminum gallium nitride (AlGaN), for example. In accordance with embodiments of the present system 10, the photodetector 20 includes a plurality of detection devices or detectors, wherein each of the detection devices comprises a photodiode, an avalanche photodiode or a semiconductor device such as a silicon carbide device. As will be appreciated, a photodiode is a semiconductor diode that produces a photovoltage or free carriers that support the conduction of photocurrent, as a result of the absorption of photons. An avalanche photodiode is a photodiode that operates with a reverse-bias voltage that causes the primary photocurrent to undergo amplification by cumulative multiplication of charge carriers.

The scintillator 16 generally includes any suitable material for converting the high energy radiation 14 to UV photons 18. For instance, the scintillator may include Li2HfO3, BaF2, CsI, CeF3, LuAlO3:Ce3+ or Lu3Al5O12:Pr3+, for instance. Preferably, the scintillator 16 comprises thallium-doped Cesium Iodide (CsI). As will be appreciated, the growth conditions under which CsI scintillators are grown may be controlled to produce needle structures which suppress lateral light spreading. The suppression of light spreading through the scintillator is desirable in radiation detection systems. As will be described further with reference to FIGS. 3-6, the scintillator 16 also comprises conical structures configured to further prevent laterally spreading of x-rays and to focus such x-rays on the individual detectors or pixels of the photodetector 20 below.

Figure 2:
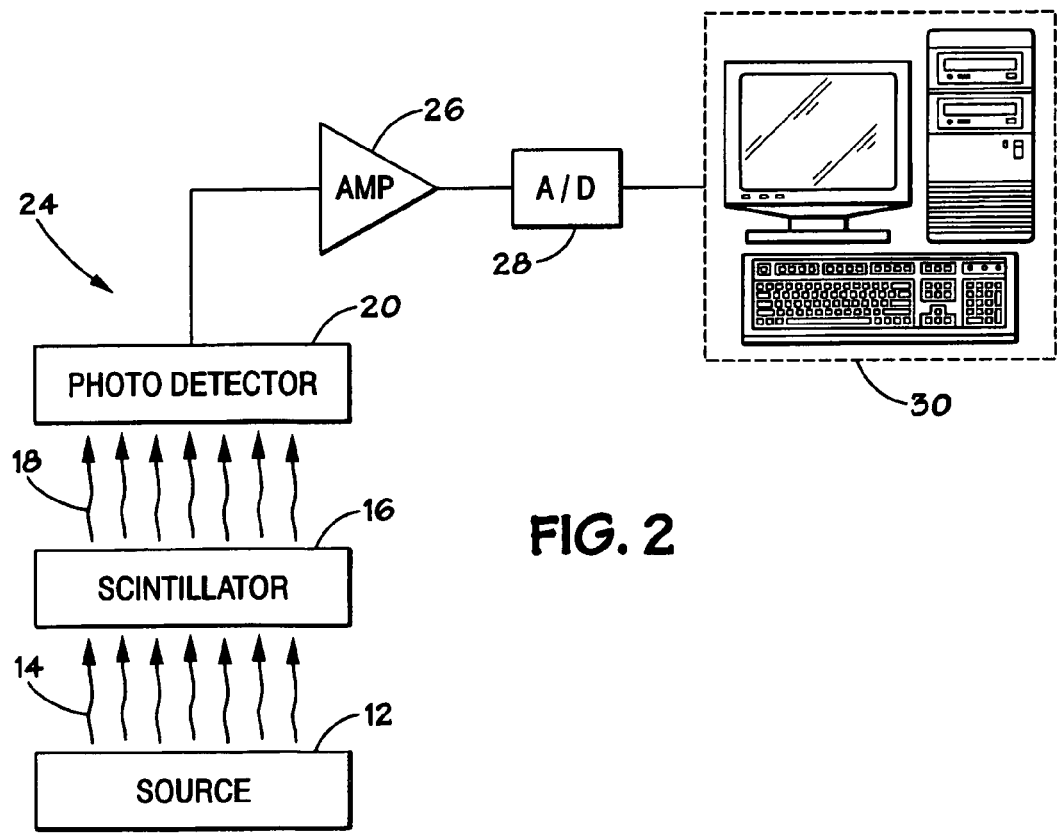
FIG. 2 is a block diagram of another exemplary embodiment of a radiation detection system employing a structured scintillator, in accordance with aspects of the present invention.

FIG. 2 is a block diagram of a detection system 24 in accordance with another exemplary embodiment of the present invention. The system 24 of FIG. 2 illustrates the system 10 described in FIG. 1, with the addition of an amplifier 26 that amplifies the electrical signal from the photodetector 20. The amplified signal is then routed to an analog-to-digital (A/D) converter 28 that samples the analog signal and generates a digital output data stream. The output data stream is then sent to a processor in a computer system 30, such as a computer system for analysis. The computer system 30 may be employed to display, store and/or manipulate the output data stream for use by users of the system 24.

Figure 3:
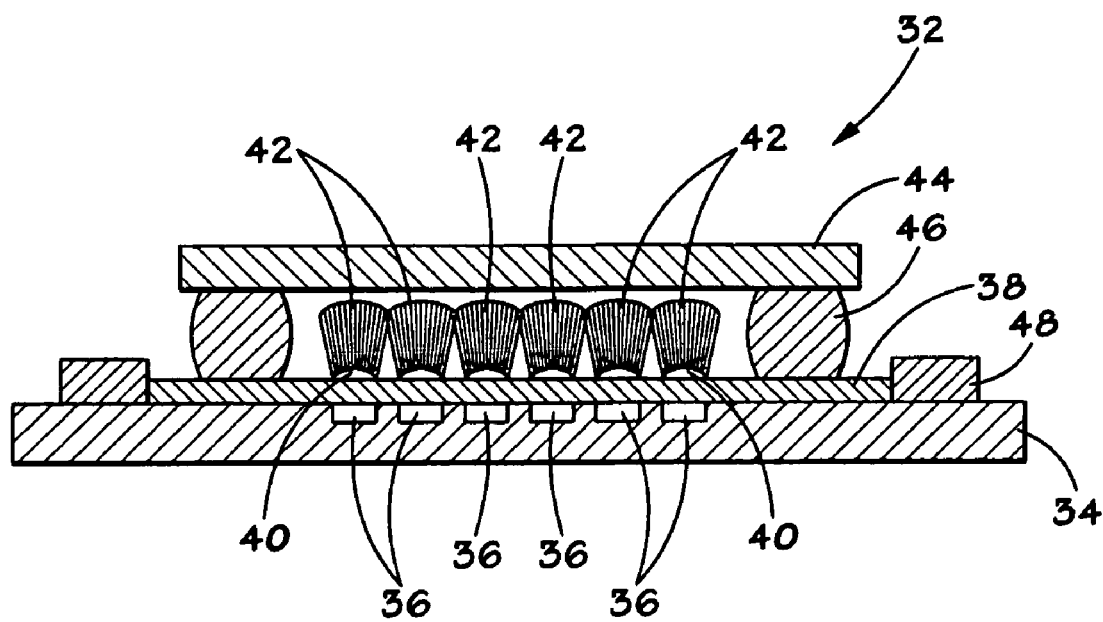
FIG. 3 is a simplified cross-sectional view of a portion of an exemplary radiation detector, in accordance with aspects of the present invention.

Referring now to FIG. 3 an exemplary embodiment of a portion of a radiation detection system 32 fabricated in accordance with exemplary embodiments of the present invention is illustrated. The detection system 32 includes an imaging array 34 comprising a number of detection devices (or "detectors") 36. The detection array 34 may comprise a flexible detection array. That is, the detectors 36 may be fabricated on a flexible substrate. As used herein, the term "flexible" generally means being capable of being bent to shape having radius of curvature of less than approximately one hundred centimeters. Thus, in accordance with one embodiment of the present invention, the detection array 34 is capable of being bent to conform with a curved surface.

The detection system 32 also includes a structured scintillator configured to guide light onto the underlying detection devices 36. In accordance with the present exemplary embodiment, the structured scintillator includes a substrate 38, a substantially transparent material layer 40, disposed on the substrate 38 and a scintillator material 42, such as cesium iodide, for example. Details of these features will be described further below. The substrate 38 may advantageously provide a barrier layer to prevent moisture or other environmental conditions from degrading the device. The detection system 32 also includes a cover plate 44, sealant 46, and conductive contact pads 48 configured to provide electrical connection of the imaging array 34 to external components. The cover plate 44 and the sealant 46 provide a protective barrier around the scintillator material 42 of the structure scintillator.

During operation, radiation from a radiation source (e.g. source 12 of FIGS. 1 and 2) penetrates the cover plate 44 and enters the scintillator material 42. The scintillator material emits optical photons in response to the absorption of incident radiation of the type to be imaged. The type of scintillator material is matched to the type of radiation being used. For example, in medical imagining with x-ray energy of about twenty to about one hundred and forty KeV thallium-doped cesium iodide (CsI) having a thickness in a range of about 100 microns to about 1000 microns may be employed. As previously discussed, the growth conditions of the CsI provide for the formation of needle structures which advantageously suppress lateral light spreading. The emitted visible light from the scintillator material then penetrates the substantially transparent material 40 and the substrate 38 and is directed into the imaging array 34. The impingement of the light onto the detection devices 36 results in the generation of corresponding electrical signals by the detection devices 36 in the array 34 that are periodically read and processed by an imaging processor in a computer system (such as the computer system 30 of FIG. 2).

In accordance with embodiments of the present invention, the presently described structured scintillator is configured to focus light on the underlying pixels or detectors 36 of the detection array 34. In other words, the scintillator material 42 is structured such that incident light is guided through the scintillator material 42 and onto a respective detection device 36. The presently described structured scintillator will focus and guide incident light, as well as reduce light spreading to adjacent pixels. In accordance with the presently described embodiment, the structured scintillator is fabricated on a substrate 38. The substrate 38 may be substantially transparent. As used herein, "substantially transparent" refers to a material allowing a total transmission of at least about fifty percent, and preferably of at least about eighty percent, of light. In one exemplary embodiment, the substrate 38 may be substantially transparent to visible light (i.e., having a wavelength in a range from about 400 nm to about 700 nm). The substrate 38 may be thin and flexible, having a thickness in the range of approximately 0.25 to 50.0 mils and preferably in the range of approximately 0.5 to 10.0 mils. Further, in accordance with embodiments of the present invention, the substrate 38 may be flexible. The substrate 38 may comprise glass, stainless steel or an organic material, for example.

In accordance with one exemplary embodiment, to fabricate a structured scintillator having scintillator material 42 which is grown or patterned into conical structures, a substantially transparent material layer 40 is disposed onto the substrate 38 and then patterned. The substantially transparent material layer 40 may comprise polyimide or photoresist, for example. The substantially transparent material layer 40 may be disposed and patterned by any conventional means, such as chemical vapor deposition (CVD) and etching, for example.

The substantially transparent material layer 40 is disposed and patterned to form a plurality of isolated regions. That is, the substantially transparent material layer 40 includes a plurality of regions which are physically isolated from one another. In one exemplary embodiment, each of the isolated regions comprises a circular disc-like shape. As will be appreciated, the isolated regions may also comprise other shapes. The isolated regions may be formed in a grid-like or array pattern across the surface of the substrate 38. The isolated regions may have an approximate feature size in a range from about 5 microns to about 200 microns. Further, the isolated regions may have a pattern pitch (center-to-center separation distance) in a range from about 5 microns to about 200.

Once the substantially transparent material layer 40 is disposed and patterned to provide a plurality of isolated regions, the scintillator material 42 may be disposed, formed, or grown into conical structures arranged to suppress lateral light spreading and to focus light onto the underlying detectors 36. In accordance with one exemplary embodiment, each of the conical structures of the scintillator material 42 is formed above a respective photo detector 36. In accordance with this exemplary embodiment, each of the isolated regions of the substantially transparent material layer 40 comprises a diameter that is approximately equal to that of the underlying photo detection device 36. An exemplary technique for growing or disposing the scintillator material 42 to form a plurality of conical structures will be described in more detail with reference to FIG. 6 below.

Figure 4:
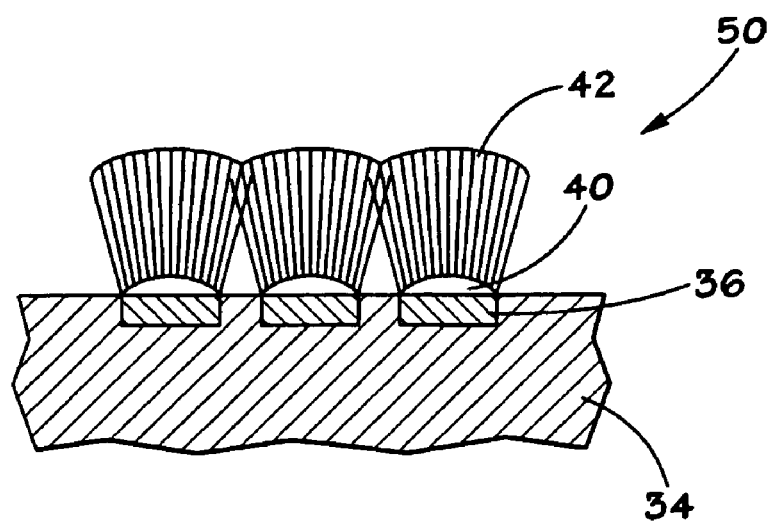
FIG. 4 is a simplified cross-sectional view of a structured scintillator, in accordance with aspects of the present invention.

FIG. 4 illustrates a partial view of a radiation detection system 50 in accordance with an alternate embodiment of the present invention. In the radiation detection system 50, the substantially transparent material layer 40 and scintillator material 42 are formed directly on the imaging array 34. That is, in the detection system 50, there is no additional substrate (e.g., substrate 38 of FIG. 3) on which the structured scintillator is fabricated. Instead, the substantially transparent material 40 is fabricated and patterned into isolated regions above each of the photo detection device 36, directly on the imaging array 34. The conical structures of the scintillator material 42 are similarly formed on each of the isolated regions of the substantially transparent material 40.

As will be appreciated, one of the advantages of the presently described structured scintillator having conical structures, is that if the structured scintillator is employed in a flexible imaging array 34, the separation between each of the individual conical structures of the structured scintillator material 42 provides stress relief if the imaging array 34 is bent or flexed. By providing separation between each of the conical structures, a certain amount of bending is possible without introducing a large amount of stress in the scintillator material 42. As will be appreciated, in uniform, non-structured scintillator devices, bending of the underline substrate or imaging array may cause damage to the scintillator material. Not only do the presently described conical configurations of the scintillator material provide better light focusing, but the isolation of each of the conical structures also provides a more robust scintillator device which is less susceptible to damage when bent or flexed, when compared to conventional scintillator devices.

Figure 5:
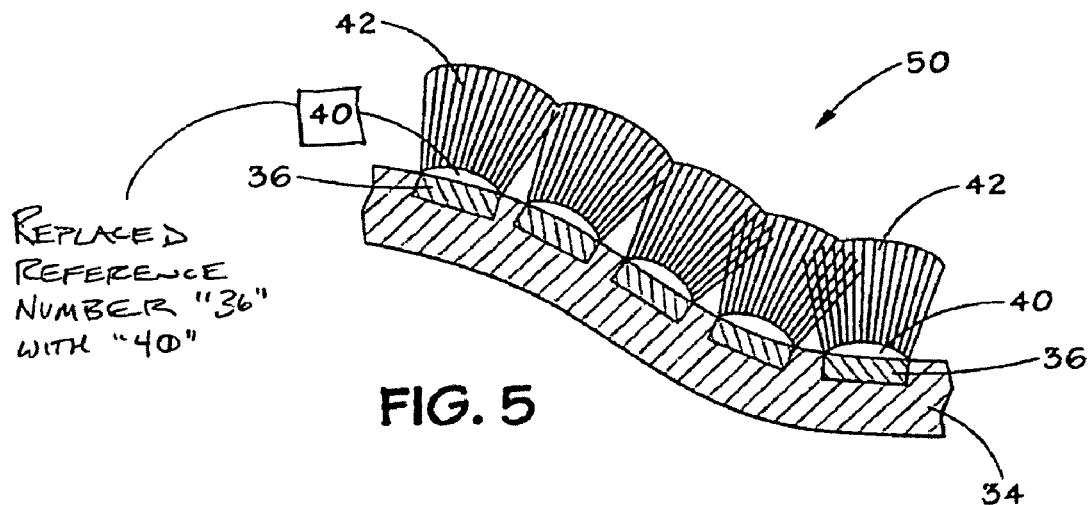
FIG. 5 is a simplified cross-sectional view of another embodiment of a structured scintillator, in accordance with aspects of the present invention.

A structured scintillator in accordance with embodiments of the present invention wherein the structured scintillator is fabricated directly on a flexible imaging array 34 is illustrated in FIG. 5. Alternatively, the substantially transparent material layer 40 may be disposed and patterned on a flexible substrate (such as the substrate 38 of FIG. 3) and then coupled to the imaging array 34. Regardless, the presently described structured scintillator having conical structures formed on the substantially transparent material layer 40 provides a more robust scintillator device having desirable light focusing qualities. As illustrated in FIG. 5, the spacing between each of the conical structures in the scintillator material 42 provides stress relief spacing to prevent damage to the scintillator material 42 if the imaging array 34 is bent. In an alternate exemplary embodiment, a flexible material such as parylene may be disposed to fill the gaps between the conical structures of the scintillator material 42.

In accordance with alternate exemplary embodiments of the present invention employing a scintillator material 42 fabricated on either a flexible substrate 38 (FIG. 3) or fabricated directly on a flexible imaging array 34 (FIGS. 5 and 6), other shapes of the scintillator material 42 may be used. For example, the scintillator material 42 may be structured to form cylindrical or cubical shapes, for instance. As will be appreciated, each scintillator structure is still separated by a small gap between structures and each structure is arranged directly above a respective photo detection device 36, as previously described and illustrated.

Figure 6:
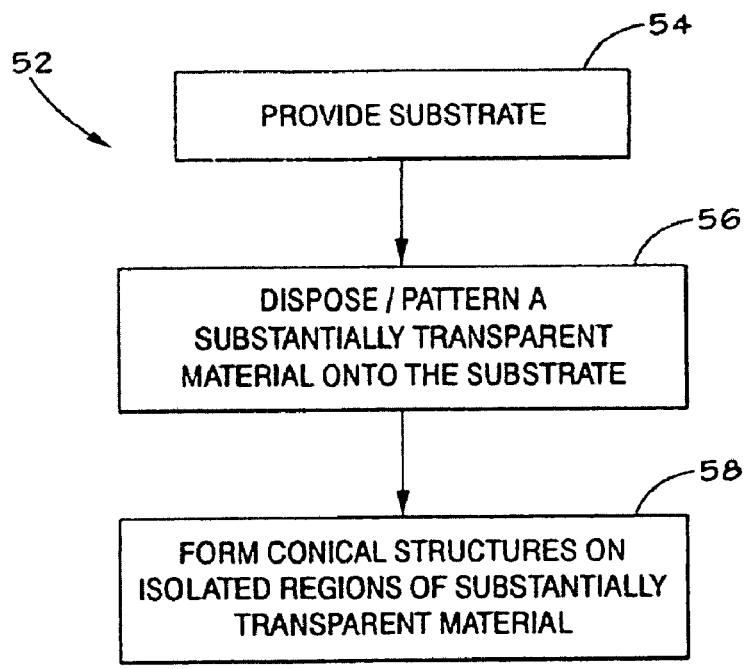
FIG. 6 is a flow chart illustrating an exemplary technique for fabricating a structured scintillator, in accordance with aspects of the present invention.

FIG. 6 illustrates a flow chart describing one exemplary technique for fabricating a structured scintillator in accordance with embodiments of the present techniques. In accordance with the exemplary process 52, a substrate is provided, as indicated in block 54. Next, a substantially transparent material layer such as photoresist or polyimide is disposed and patterned to form a plurality of isolated regions on the substrate using standard lithographic techniques, as indicated in block 56. The substantially transparent material layer may then be patterned to provide a plurality of isolated regions arranged in an array. Next, the scintillator material is formed, disposed, or grown onto the isolated regions of the substantially transparent material, as indicated in block 58.

In accordance with one exemplary embodiment, the substrate having the isolated regions patterned thereon is placed in a vapor deposition chamber. By rotating the substrate and controlling the angle at which the scintillator material is directed onto the substrate, conical structures may be formed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A structured scintillator comprising:
   a flexible substrate;
   a substantially transparent material layer disposed on the flexible substrate and patterned to provide a plurality of isolated regions; and
   a scintillator material disposed on the isolated regions to form a plurality of isolated structures having curved surfaces, wherein the isolated structures each comprise a plurality of needle structures.

2. The structured scintillator of claim 1, wherein the substantially transparent material comprises a polymide.

3. The structured scintillator of claim 1, wherein the substantially transparent material comprises a photoresist.

4. The structured scintillator of claim 1, wherein the substantially transparent material layer is patterned into grid pattern.

5. The structured scintillator of claim 1, wherein the substantially transparent material layer is patterned such that each of the isolated regions is configured to align with a respective pixel of an underlying photo detection device.

6. The structured scintillator of claim 1, wherein the scintillator material comprises thallium-doped cesium iodide.

7. The structured scintillator of claim 1, wherein each of the plurality of isolated structures is conical in shape.

8. The structured scintillator of claim 1, wherein the isolated regions comprise a circular disc-like shape.

9. A structured scintillator comprising:
   a substrate;
   a substantially transparent material layer disposed on the substrate and patterned to provide a plurality of isolated regions; and
   a scintillator material disposed on the substantially transparent material layer and comprising a plurality of conical structures, wherein the conical stuctures each comprise a plurality of the needle structures.

10. The structured scintillator of claim 9, wherein the substantially transparent material comprises a polymide.

11. The structured scintillator of claim 9, wherein the substantially transparent material comprises a photoresist.

12. The structured scintillator of claim 9, wherein the substantially transparent material layer is patterned into grid pattern.

13. The structured scintillator of claim 9, wherein each of the isolated regions comprises a shape having a feature size in the range of about 5 microns to about 200.

14. The structured scintillator of claim 9, wherein the pattern pitch between each of the isolated regions is in the range of about 5 microns to about 200 microns.

15. The structured scintillator of claim 9, wherein the substantially transparent material layer is patterned such that each of the isolated regions is configured to align with a respective pixel of an underlying photo detection device.

16. The structured scintillator of claim 9, wherein the scintillator material comprises thallium-doped cesium iodide.

17. The structured scintillator of claim 9, wherein each of the plurality of conical structures is disposed on a respective one of the isolated regions.

18. The structured scintillator of claim 9, wherein the substrate comprises a flexible substrate.

19. A scintillator comprising a material structured to form a plurality of conical structures each comprising a plurality of needle structures configured to guide photons, wherein each of the plurality of conical structures comprises a top portion configured to receive incident radiation and a bottom, portion configured to emit photons, wherein the bottom portion is narrower than the top portion.

20. The scintillator, as set forth in claim 19, wherein the bottom portion of each of the conical structures is not in contact with the bottom portion of any other of the plurality of conical structures.

21. The scintillator, as set forth in claim 19, wherein the bottom portion of each of the conical structures comprises a feature size in the range of about 5 microns to about 200 microns.

22. The scintillator, as set forth in claim 19, wherein the material comprises thallium-doped cesium iodide.

23. A method of fabricating a scintillator comprising:
    patterning a substantially transparent material onto a substrate to provide a plurality of isolated regions of the material on the substrate; and
    forming a conical scintillator structure on each of the plurality of isolated regions, wherein the conical scintillator structures each comprise a plurality of needle structures.

24. The method, as set forth in claim 23, wherein forming comprises growing the conical scintillator structure on each of the plurality of isolated regions.

25. The method, as set forth in claim 23, wherein forming comprises disposing a scintillator material onto the substantially transparent material while at least one of the transparent material or a dispenser for disposing the scintillator material is rotating.

* * * * *